Patented Dec. 26, 1944

2,366,018

UNITED STATES PATENT OFFICE 2,366,018

ANTIOXIDANT

Carlin F. Gibbs, Silver Lake, Ohio, assignor to The B. F. Goodrich Company, New York, N. Y., a corporation of New York No Drawing. Application October 15, 1943, Serial No. 506,426

14 Claims. (Cl. 260—808)

This invention relates to the preservation of organic materials which tend to deteriorate by the absorption of oxygen from the air, and pertains more specifically to the preservation of rubber by the incorporation therein of an antioxidant.

It has heretofore been proposed by Craig in U. S. Patent 2,048,781, issued July 28, 1936, to employ various aromatic substituted aminoindans as antioxidants. The patentee discloses as his preferred class those compounds in which the indan group is attached to the amino nitrogen at the 1- or alpha-position:

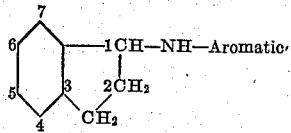

The class of compounds disclosed is said to be generally useful for the preservation of rubber and other organic materials which deteriorate by absorption of oxygen from the atmosphere.

I have now discovered that of this broad class of compounds, those in which the amino nitrogen is attached to the indan ring at the 5-position give results far superior to any of the other members of the class. A typical example of my new antioxidants is 5-anilino indan, which has the following structure:

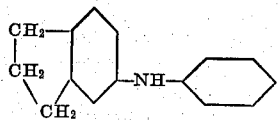

These compounds may be prepared, for example, by making a 5-aminoindan by the method of Lindner and Bruhin, Berichte 60, 435 (1927). The 5-aminoindan thus prepared may then be condensed with a halogenated aromatic compound in order to give the desired product. Various substituents, such as alkyl, alkenyl, aryl, aralkyl, hydroxy, alkoxy and aryloxy groups may be present on either the 5-indan or the aromatic group. It is generally desirable, however, to have no acidic group present, such as nitro, carboxyl, sulfonic, or the like.

Among the compounds which fall within the scope of my invention are 5-(2-methylanilino) indan, 5-(4-hydroxyanilino) indan, 1-methyl-5-anilino indan, 2-methyl-5-anilino indan, 3-methyl-5-anilino indan, 1,2-dimethyl-5-anilino indan, 2,2-diethyl-5-anilino indan, 5-(beta-naphthylamino) indan, 5-(alpha-naphthylamino) indan, di-(1-methyl-5-indanamine), di-(1,2-dimethyl-5-indanamine), di-(2-methyl-5-indanamine), di-(1-isopropyl-5-indanamine), 1-methyl-di-(5-inranamine), 1,2-dimethyl-di-(5-indanamine), N-(p-phenoxy phenyl)-5-indanamine, N-(o-phenoxy phenyl) - 5 - indanamine, di-(5-indan)-p-phenylenediamine, and the like. The 5-(arylamino) indans are preferred.

The following specific examples will serve further to illustrate the nature of the preparation of my new compounds.

Example I

The preparation of 5-anilino indan may be carried out by first preparing 5-aminoindan by the method of Lindner et al., loc. cit., and then condensing it with o-chlorobenzoic acid followed by decarboxylation. Although chlorobenzene may be used, in which case decarboxylation is unnecessary, it has been found that better results are obtained by following the above-described procedure. A mixture of 26.6 parts by weight of 5-aminoindan, 31.5 parts of o-chlorobenzoic acid, and 32 parts of potassium carbonate was heated to a temperature of about 160° C. in order to remove all water. It was then cooled to about 130° C., and 0.5 part of powdered copper was added. Upon heating to 150° C., a reaction occurred. Completion of the reaction was ensured by gradually raising the temperature to about 220° C. over a period of about 2½ hours. After cooling, 500 parts of water were added to the mixture, and the copper was removed by filtration. Upon acidification of the filtrate with acetic acid, a precipitate formed, which was collected and dried. The product was readily decarboxylated by heating to 250° C. for 10 minutes. The resultant material, after distillation at reduced pressure, was reasonably pure 5-anilinoindan. If a completely pure product is desired the material may be dissolved in 50 parts of benzene and the solution washed with several portions of 5% aqueous sodium hydroxide solution. After removal of the benzene by heating at atmospheric pressure, the product may be redistilled at reduced pressure (B. P. 168–182° C. at 1 mm.). Recrystallization from hexane gives a white crystalline solid melting at 45° to 46° C. Analysis gives values corresponding to those calculated for 5-anilino indan.

Example II

Di-(5-indanamine) may be prepared by condensing 5-aminoindan with 5-chloroindan. The latter compound may be prepared from 5-aminoindan by the well-known Sandmeyer reaction as described in Organic Syntheses 3, 33 (1923). To 91 parts by weight of 37% aqueous hydrochloric acid there was added 32 parts of 5-aminoindan. The mixture was cooled to about 0° C., and to it was added 16.8 parts of sodium nitrite dissolved in 48 parts of water. This solution was then added slowly and with stirring to a 0.3 molar solution of cuprous chloride in hydrochloric acid at 0° C. After standing at room temperature for about two hours the mixture was heated to 60° C. in order to ensure completion of the reaction. The product was then steam-distilled, dissolved in about 50 parts of benzene, washed with several portions of concentrated sulphuric acid, and finally with water. The benzene was removed by heating at atmospheric pressure and the product distilled at reduced pressure. It boiled at about 110–113° C. at 25 mm.

The condensation of 5-chloroindan with 5-aminoindan was then carried out. About 40 parts by weight of 5-aminoindan was heated to reflux temperature with about 0.3 part of cupric chloride. About 3.2 parts of metallic sodium were added slowly over a period of about 40 minutes. There were then added about 26 parts of 5-chloroindan, and the mixture was refluxed for about 15 minutes. After cooling to about 100° C., 50 parts of water were added rapidly, and the mixture was filtered. It was found that the addition of 50 parts of benzene facilitated the filtration greatly. After drying the filtrate, the benzene was removed by heating at atmospheric pressure, and the product was distilled at reduced pressure, boiling at about 170–180° C. at 1 mm. The product, a yellow oil, was found by analysis to have the composition calculated for di(5-indanamine).

Other N-aromatic-substituted 5-aminoindans may be prepared by employing the appropriate 5-aminoindan and halogenated aromatic compound as starting materials.

In order to show the superiority of my new compounds as antioxidants, the following rubber composition was prepared:

| | |
|---|---|
| Rubber | 100.0 |
| Carbon black | 50.0 |
| Zinc oxide | 5.0 |
| Sulfur | 3.0 |
| Stearic acid | 3.5 |
| Pine tar | 3.0 |
| 2-mercaptobenzothiazole | 1.0 |
| Antioxidant | 2.0 |

Compositions based on the above recipe and containing various antioxidants were vulcanized 60 minutes at 279° F. The ultimate tensile strength and ultimate elongation of the resulting vulcanized compositions were measured before and after subjecting the products to accelerated aging in oxygen at 70° C. and 300 lb. per sq. in. for 96 hours, with the results given in the table below:

| Antioxidant | Percent decrease after aging | |
|---|---|---|
| | Tensile | Elongation |
| None | 73 | 50 |
| 4-anilino indan | 35 | 18 |
| 5-anilino indan | 25 | 16 |

Other portions of the compositions were aged 14 days in a Geer oven at 70° C. and flexed on a De-Mattia flexing machine at 80° F. at the rate of 300 flexures per minute. The samples were rated on a scale ranging from 0 (no cracks) to 10 (rupture). The results were as follows:

| Antioxidant | No. flexures | Rating |
|---|---|---|
| None | 300,000 | 7 |
| 4-anilino indan | 2,000,000 | 7 |
| 5-anilino indan | 5,000,000 | 6.3 |

It is clear from these results that my new compounds are far superior to other compounds of the same general class. Similar results may be obtained when other N-aromatic-substituted 5-aminoindans are compared with N-aromatic-substituted aminoindans in which the amino group is attached to the indan nucleus at other positions.

In another example N-(p-isopropoxyphenyl)-5-indanamine was employed as the antioxidant in the rubber composition given above. The loss in tensile strength after aging 96 hours in oxygen at 70° C. and 300 lbs. per sq. in. pressure was only about one-third as great as the loss in a similar composition containing no antioxidant. When flexed, after aging fourteen days in a Geer oven, the sample containing antioxidant resisted rupture about nine times as long as did the sample containing no antioxidant.

In a third example di-(5-indanamine) was employed as the antioxidant in the above composition. The loss in tensile strength of this composition after aging was only about one-half as great as the loss in a similar composition containing no antioxidant, and the former withstood about ten times as many flexures as the latter before reaching an index of 7.

My new compounds are effective in amounts ranging from 0.1 to 5% or more of the rubber composition. They may also be used for the preservation of other organic substances which tend to deteriorate in the presence of air, such as fish oil, linseed oil, tung oil, gasoline containing unsaturates, and the like, but they are particularly valuable for use in rubber or synthetic rubber compositions. They are effective with any kind of rubber, such as caoutchouc, balata, gutta percha, latex, reclaimed rubber, artificial rubber isomers, and such synthetic rubbers as polychloroprene, copolymers of butadiene with acrylonitrile, styrene, methyl acrylate, methyl methacrylate, isobutylene, and other copolymerizable monomers. The term "a rubber" as used in the appended claims is intended to designate all of the above-mentioned materials.

My new antioxidants may be added to the material to be preserved in any suitable manner; they may be added in the form of a solution or emulsion or used in their pure form. They may be added to the rubber on a roll mill or in an internal mixer, or by any other suitable method. They may be applied to the surface of the rubber composition, either in their pure form or as a solution or paste, or they may be dispersed in the rubber latex. It is accordingly to be understood that the term "treating" is employed in the appended claims in a generic sense to embrace the incorporation of the antioxidant into the rubber by any of the above-described methods.

The rubber compositions containing my new antioxidants may be used for a variety of purposes, such as the manufacture of hose, belting, rubber thread, rubberized fabrics, boots, shoes, molded goods, tires and inner tubes, latex dipped goods, and the like.

Any of the usual pigments, fillers, dyes, accelerators of vulcanization, or other antioxidants may be used in conjunction with my new antioxidants without destroying the superior properties of the composition containing them.

Although I have herein disclosed specific examples of my invention, I do not intend to limit myself solely thereto, but to include all of the obvious variations and modifications within the scope of the appended claims.

I claim:

1. The method of preserving a rubber which comprises treating it with a compound of the structure $R_1$—NH—$R_2$ in which $R_1$ is an aromatic radical and $R_2$ is an indan radical attached to the nitrogen at the 5-position, said compound being free from acidic groups.

2. The method of preserving rubber which comprises treating it with a compound of the structure $R_1$—NH—$R_2$ in which $R_1$ is an aromatic radical and $R_2$ is an indan radical attached to the nitrogen at the 5-position, said compound being free from acidic groups.

3. The method of preserving a rubber which comprises treating it with a 5-(arylamino) indan which is free from acidic groups.

4. The method of preserving rubber which comprises treating it with a 5-(arylamino) indan which is free from acidic groups.

5. The method of preserving rubber which comprises treating it with 5-anilino indan.

6. The method of preserving rubber which comprises treating it with N-(p-isopropoxy phenyl)-5-indanamine.

7. The method of preserving rubber which comprises treating it with di-(5-indanamine).

8. A composition comprising a rubber and a compound of the structure $R_1$—NH—$R_2$ in which $R_1$ is an aromatic radical and $R_2$ is an indan radical attached to the nitrogen at the 5-position, said compound being free from acidic groups.

9. A composition comprising rubber and a compound of the structure $R_1$—NH—$R_2$ in which $R_1$ is an aromatic radical and $R_2$ is an indan radical attached to the nitrogen at the 5-position, said compound being free from acidic groups.

10. A composition comprising a rubber and a 5-(arylamino) indan which is free from acidic groups.

11. A composition comprising rubber and a 5-(arylamino) indan which is free from acidic groups.

12. A composition comprising rubber and 5-anilino indan.

13. A composition comprising rubber and N-(p-isopropoxy phenyl)-5-indanamine.

14. A composition comprising rubber and di-(5-indanamine).

CARLIN F. GIBBS.